United States Patent [19]
Howie, Jr.

[11] Patent Number: 5,197,161
[45] Date of Patent: Mar. 30, 1993

[54] FRICTION FIT KNOB FOR SHAFT WITH END OF U-SHAPED CROSS-SECTION

[75] Inventor: Robert K. Howie, Jr., Decatur, Ill.

[73] Assignee: The Grigoleit Company, Decatur, Ill.

[21] Appl. No.: 895,645

[22] Filed: Jun. 9, 1992

[51] Int. Cl.[5] .................... A47B 95/02; G05G 1/10; B25G 3/02
[52] U.S. Cl. .............................. 16/121; 16/DIG. 30; 74/553; 403/361
[58] Field of Search .................. 16/121, DIG. 30; 292/349; 403/361; 74/553

[56] References Cited
U.S. PATENT DOCUMENTS

| | | | |
|---|---|---|---|
| 3,193,312 | 7/1965 | Ehner | 292/349 |
| 3,336,059 | 8/1967 | Leitmann | 74/553 |
| 3,679,252 | 7/1972 | Howie, Jr. | |
| 4,179,771 | 12/1979 | Rankins et al. | 16/121 |
| 4,295,246 | 10/1981 | Howie, Jr. | 16/121 |
| 4,441,230 | 4/1984 | Howie, Jr. | 16/121 |
| 4,923,325 | 5/1990 | Howie, Jr. | |

Primary Examiner—John Sipos
Assistant Examiner—Carmine Cuda
Attorney, Agent, or Firm—Kinzer, Plyer, Dorn, McEachran & Jambor

[57] ABSTRACT

A molded knob of the type which frictionally engages and fits over the end of a shaft, which shaft end is of generally U-shaped, transverse cross-section created by the removal of a portion of a circular tubular shaft. A hub is formed as part of the knob. A shaft-receiving socket of generally circular, transverse cross-section is formed in the hub. A pair of generally L-shaped fingers are formed as part of the hub and extend the depth of the socket. The L-shaped fingers are positioned back-to-back to define a U-shaped slot between the fingers and hub, which U-shaped slot receives the U-shaped end of the shaft. Each L-shaped finger has a base portion which is molded integrally with the core and a back portion which extends cantileverly from the base portion, with the base and back portions connected by an integral hinge. The back portions of the L-shaped fingers are spaced from each other about their integral hinges and are flexible so as to bend toward each other when the shaft is inserted in the socket. The back portions of the fingers have bulbous protrusions near their tips to frictionally engage the inside surface of the U-shaped shaft end as torque is applied to the knob.

4 Claims, 1 Drawing Sheet

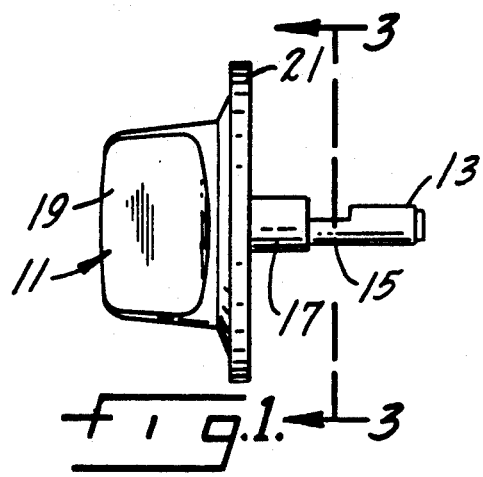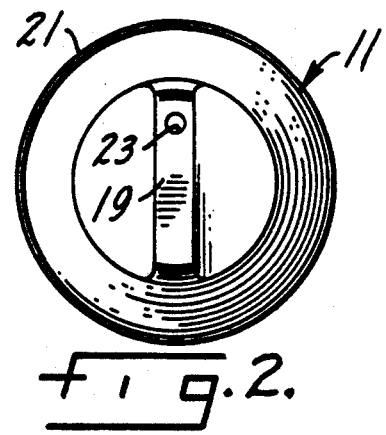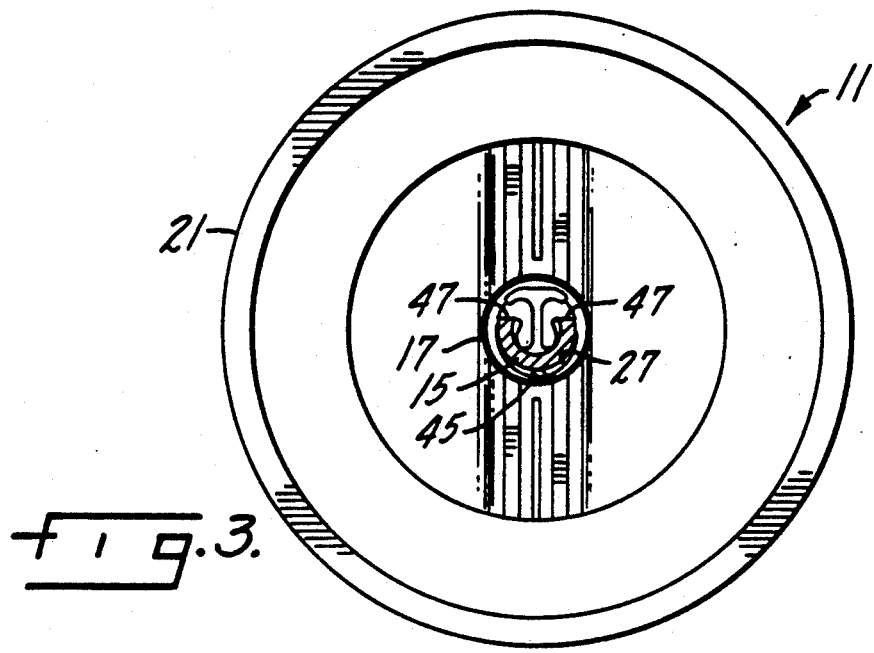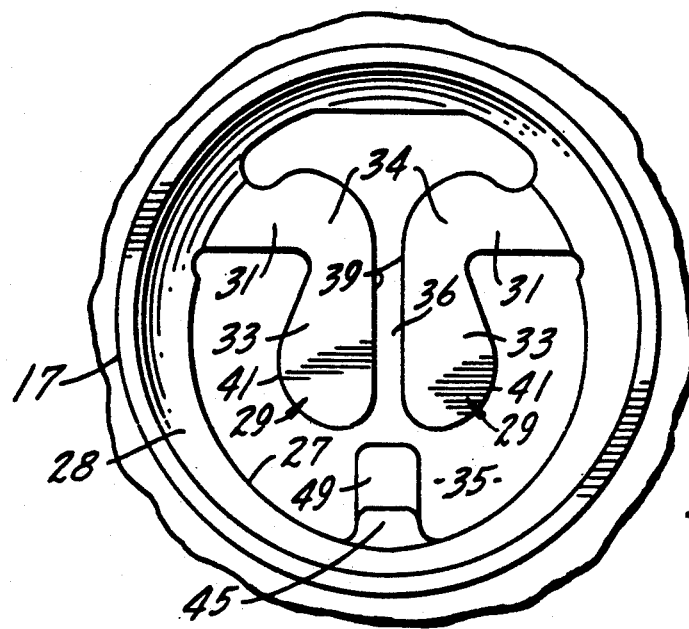

5,197,161

FRICTION FIT KNOB FOR SHAFT WITH END OF U-SHAPED CROSS-SECTION

BACKGROUND AND SUMMARY OF THE INVENTION

This invention is directed to a molded plastic friction fit knob.

An object of this invention is a molded plastic friction fit knob having resilient fingers which firmly engage a shaft having an end portion of U-shaped cross-section by frictionally engaging the inside surface of the U-shaped end portion.

Another object of this invention is a molded plastic friction fit knob having resilient fingers which are forced toward each other to resiliently grip a shaft when the shaft is inserted into the socket of the knob.

Another object of this invention is a molded plastic friction fit knob having a pair of L-shaped resilient fingers positioned back-to-back in a knob socket, which fingers provide a securing grip to shafts of U-shaped cross-section at their ends which vary within a range of tolerances of both internal and external diameters of the U-shaped end of the shafts.

Another object of this invention is a molded plastic friction fit knob having a high torquing capability.

Other objects may be found in the following specification, claims and drawings.

BRIEF DESCRIPTION OF THE DRAWINGS

The invention is illustrated more or less diagrammatically in the following drawings wherein:

FIG. 1 is a side elevational view of a knob of this invention mounted on a shaft having an end portion of U-shaped, transverse cross-section;

FIG. 2 is a front end view of a knob of this invention;

FIG. 3 is an enlarged rear view of the knob taken along line 3—3 of FIG. 1; and

FIG. 4 is an enlarged rear view of the knob of this invention with the shaft removed from the socket of the knob.

DESCRIPTION OF THE PREFERRED EMBODIMENT

FIGS. 1 and 3 of the drawings show a molded knob 11 embodying the novel features of this invention mounted on a tubular shaft 13 having an end 15 of U-shaped cross-section. The U-shaped end of the shaft is obtained by cutting away a portion of a circular tubular shaft. The shaft 13 may be formed as an integral part of the device that it operates such as a switch or valve or the like.

The knob 11 of this invention may be molded from a thermoplastic material such as nylon or other suitable material. The knob 11 is preferably formed in one piece with a cylindrical-shaped hub portion 17, a blade-like handle portion 19 and a skirt portion 21 with the hub and handle portions extending from opposite sides of the skirt portion 21. A recessed convex shaped position indicator 23 is formed on the front of the handle portion. A socket 27 of somewhat oval transverse cross-section is formed in the hub portion 17 of the knob leaving the socket surrounded by an annular wall 28. A pair of generally L-shaped fingers 29 are formed integrally with the hub and extend into the socket for the full depth thereof. Each L-shaped finger has a base portion 31 which connects to the wall 28 of the hub 17 and extends into the socket 27 and a longer back portion 33 which is formed integrally with and cantileverly extends from its base portion 31. The base and back portions of each finger join at an integral hinge 34.

The back portions 33 of the L-shaped fingers 29 are positioned back-to-back in the middle of the socket 27 to form a U-shaped slot 35 with the annular wall 28. The slot 35 is dimensioned to receive the U-shaped end 15 of the shaft 13. A diametrically extending slot 36 is formed between the back portions 33 of the fingers. Each back portion 33 of each L-shaped finger has a flat surface 39 on its side facing the other finger and a bulbous protrusion 41 on its outward side.

A radially inwardly-extending projection 45 is formed on the inner surface of the annular wall 28 of the hub 17 in the U-shaped slot 35. The projection is located longitudinally inwardly of the open end of the socket 27 and inwardly of the outer ends of the L-shaped fingers 29. The wall 28 is thinnest at the portion of the wall adjacent the projection to provide a clearance space or gap to facilitate insertion of the U-shaped end 15 of the shaft 13 into the socket 27. In lieu of the gap formed by thinning the wall 28, a notch could be formed in the wall 28 at this location. The projection 45 is in alignment with the slot 36 located between the back portions 33 of the L-shaped fingers. The projection 45 engages the outer surface of the U-shaped end 15 of the shaft 13 shortly after the shaft is first inserted into the socket 27 and functions to force the inner surfaces 47 of the U-shaped end 15 of the shaft 13 against the bulbous protrusions 41 of the back portions 33 of the L-shaped fingers 29. Because the projection 45 is sloped radially inwardly as viewed in FIG. 4 of the drawings, continued insertion of the shaft 13 into the socket 27 brings the upper edges 47 of the U-shaped end of the shaft 15 into contact with the base portions 31 of the L-shaped fingers 29. The projection 45 cooperates with a bevel on the front of the U-shaped end 15 of the shaft 13 for piloting purposes. A stop 49 is formed in the socket 27 to limit the insertion of the shaft 13 into the socket.

The flexibility of the back portions 33 of the L-shaped fingers 29 and their bulbous protrusions 41 enable the knob 11 to tightly engage shafts 13 having U-shaped ends 15 which vary within tolerance limits between maximum and minimum inside and outside diameters of the U-shaped ends while at the same time the socket 27 varies in its internal diameter between maximum and minimum limits.

The thinning of the annular wall 28 of the hub before and adjacent the projection 45 provides a clearance space or gap between the outer wall of the U-shaped end 15 of the shaft and the wall 28. Therefore, the outer wall of the U-shaped shaft end 15 engages the annular wall 28 only at locations approximately diametrically opposite the hinges 34 of the L-shaped fingers 29 when the external diameter of the U-shaped shaft is at its maximum tolerance. At smaller external diameters of the U-shaped end 15, torque and friction are exerted principally against the L-shaped fingers 29 either through engagement of the bulbous protrusions 41 with the inside wall of the shaft or due to the engagement of the upper edges 47 of the end 15 of the shaft with the base portions 31 of the fingers. The engagement of the bulbous protrusions 41 of the L-shaped fingers 29 with the inside wall of the shaft end 15 transfers torque to the shaft and prevents the upper edges 47 of the end 15 of the shaft from digging into the base portions 31 of the fingers. With minimum shaft diameters within the range of tolerances, the external wall of the shaft does not contact the annular wall 28 of the socket 27 but instead the fingers 29 transmit torque and friction between the shaft 13 and the hub 17 of the knob 11.

I claim:

1. A molded knob of the type which frictionally engages and fits over the distal end of a shaft having a generally U-shaped, transverse cross-section,
   a hub formed as part of said knob,
   a shaft-receiving socket formed in said hub,
   said socket being of generally circular transverse cross-section, and
   a pair of generally L-shaped fingers formed as part of said hub and extending into said socket,
   said L-shaped fingers being positioned back-to-back to define a U-shaped slot between said fingers and said hub to receive said U-shaped end section of said shaft.

2. The knob of claim 1 in which each of said L-shaped fingers has a base leg attached to said hub and a back leg extending cantileverly from said base leg.

3. The molded knob of claim 1 in which said L-shaped fingers are spaced from each other and are adapted to be bent toward each other by engagement with the inside surface of said U-shaped end of said shaft as the shaft is inserted into the hub.

4. The molded knob of claim 1 in which a clearance space is provided in said socket at the base of said U-shaped slot to facilitate insertion of said shaft into said slot.

* * * * *